United States Patent
Wang

[19]

[11] Patent Number: 6,161,448
[45] Date of Patent: Dec. 19, 2000

[54] BRAKE CABLE ADJUSTING DEVICE FOR A BICYCLE

[76] Inventor: Chin-Feng Wang, No. 283-15, Kuang-Ming Rd., Taichung, Taiwan

[21] Appl. No.: 09/387,153

[22] Filed: Aug. 31, 1999

[51] Int. Cl.[7] .............................. B62K 23/06; B62L 3/02
[52] U.S. Cl. ............................................ 74/502.2; 74/489
[58] Field of Search .................................. 74/489, 502.2, 74/488

[56] References Cited

U.S. PATENT DOCUMENTS

| | | | |
|---|---|---|---|
| 5,448,927 | 9/1995 | Lumpkin | 74/502.2 |
| 5,515,743 | 5/1996 | Lumpkin | 74/502.2 |
| 5,660,082 | 8/1997 | Hsieh | 74/502.2 |
| 5,819,589 | 10/1998 | Nakashima et al. | 74/489 |

Primary Examiner—Mary Ann Green
Attorney, Agent, or Firm—Gardere & Wynne, L.L.P.; Sanford E. Warren, Jr.

[57] ABSTRACT

A brake lever device includes a grip part and a mounting arm extending transversely from the grip part wherein the mounting arm is pivotally connected to a body mounted to the handlebar. The mounting arm has a first slot with a pin movably extending therethrough which is connected to a bracket to which the cast lug barrel of the brake cable is fixedly connected. The mounting arm has a second slot with a sleeve movably extending therethrough and an adjusting bolt extends through the second slot and threadedly transversely extends through the sleeve. A connecting device connected between the pin and the sleeve. The second slot is oriented substantially in parallel with the direction of the tension force of the brake cable.

6 Claims, 4 Drawing Sheets

BRAKE CABLE ADJUSTING DEVICE FOR A BICYCLE

FIELD OF THE INVENTION

The present invention relates to a brake cable adjusting device for a bicycle, and more particularly, to an adjusting device adjusting the leverage applied to the brake cable by rotating an adjusting bolt located at the inside of the grip part of the brake lever device.

BACKGROUND OF THE INVENTION

A conventional brake cable adjustable device known to applicant is disclosed in U.S. Pat. No. 5,448,927 to Avid Enterprises, Inc., issued on Sep. 12, 1995 and having the title of "Adjustable Leverage Brake Lever". In the above identified patent, the jack bolt extends through the mounting arm from the outside of the mounting arm so that when adjusting the leverage applied to the brake cable, the user simply rotates the knurled head of the jack bolt. By this way, the distance between the pivotable arm can be varied. Nevertheless, the knurled head of the jack bolt is exposed on and extending from the outside of the mounting arm so that the knurled head could tangle, or even hurt the user or a person passing beside the bicycle. Furthermore, the direction of the tension force of the brake cable is substantially perpendicular to the direction of movement of the cylinder and the jack bolt so that the user has to take effort to rotate the jack bolt to overcome the resistance force.

The present invention intends to provide a brake cable adjusting device for a bicycle and the device has an adjusting bolt located at the inside of the brake lever. A sleeve is connected to the brake cable and the adjusting bolt threadedly extends the sleeve which is movable in parallel with the direction of the tension force of the brake cable. By this way, the adjusting bolt is easily rotated.

SUMMARY OF THE INVENTION

In accordance with one aspect of the present invention, a brake lever device for a bicycle comprises a brake lever including a grip part and a mounting arm extending laterally from the grip part. The mounting arm has a first slot oriented substantially in perpendicular with the direction of the tension force of the brake cable. A second slot is defined through the mounting arm and oriented substantially in parallel with the direction of the tension force of the brake cable.

A bracket is connected to a cast lug barrel of the brake cable and a pin extends through the bracket. The pin movably extends through the first slot.

A sleeve movably extends through the second slot and a threaded hole is defined transversely through the sleeve. An adjusting bolt extends through the mounting arm and threadedly extends the threaded hole of the sleeve. An end member is fixedly connected to the adjusting bolt on the outside of the mounting arm. A connecting means is connected between the sleeve and the pin.

The object of the present invention is to provide a brake cable adjusting device wherein the adjusting bolt is located on the inside of the grip part of the brake lever device.

Another object of the present invention is to provide a brake cable adjusting device wherein the adjusting bolt is rotated without much effort.

Further objects, advantages, and features of the present invention will become apparent from the following detailed description with appropriate reference to the accompanying drawings.

DETAILED DESCRIPTION OF THE PREFERRED EMBODIMENT

Figure 1:
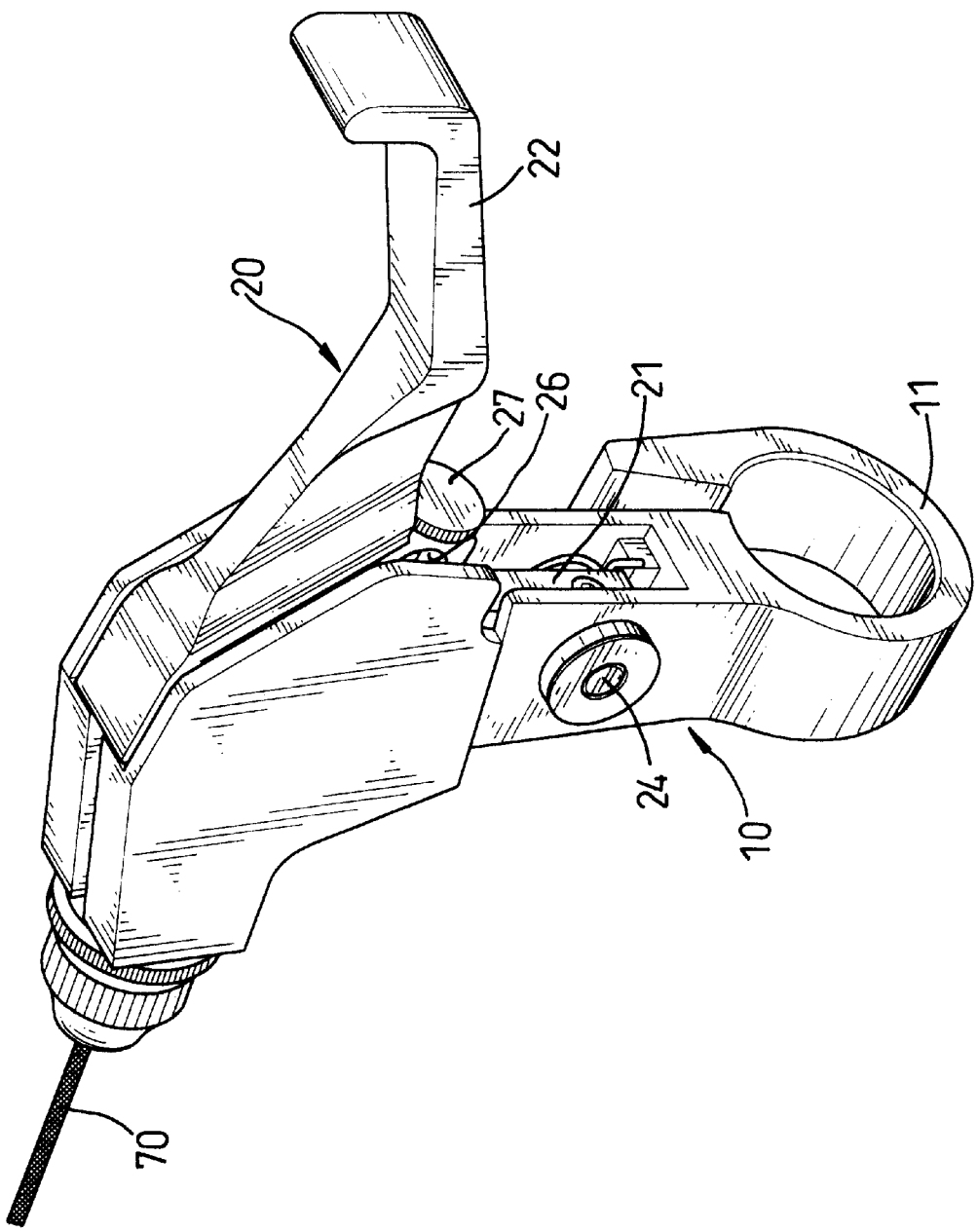
FIG. 1 is a perspective view of the brake lever device in accordance with the present invention.
Figure 2:
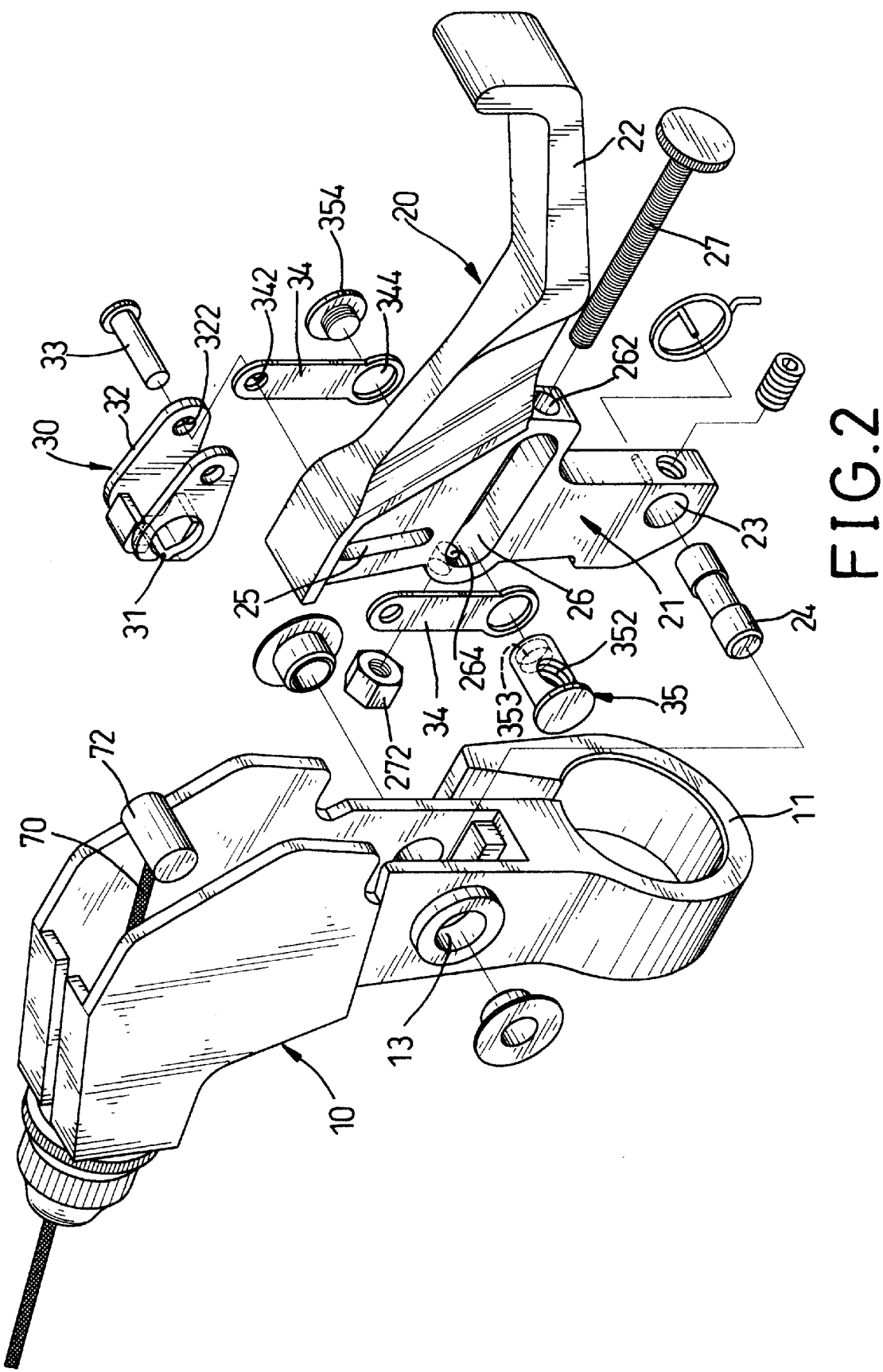
FIG. 2 is an exploded view of the brake lever device in accordance with the present invention.

Referring to FIGS. 1 and 2, the brake lever device for a bicycle includes a body (10) having a C-shaped clamping portion (11) so as to let a handlebar (110) (see FIG. 3) of the bicycle be clamped through the C-shaped portion (11). A brake cable (70) movably extends through the body (10) and a cast lug barrel (72) is connected to one of two distal ends of the brake cable (70), the other distal end of the brake cable (70) is connected to a front or rear brake mechanism (not shown).

A brake lever (20) has a grip part (22) and a mounting arm (21) extending laterally from the grip part (22). The mounting arm (21) has a hole (23) and is inserted between two sidewalls of the body (10) so as to let a pin (24) extend through the two holes (13) respectively defined through the two sidewalls and the hole (23) of the mounting arm (21) so that the brake lever (20) is pivotally connected to the body (10). A first slot (25) is defined through the mounting arm (21). A bracket (30) has a receiving portion (31) connected to the first end thereof so as to securely receive the cast lug barrel (72) of the bracket (30). The second end of the bracket (30) has two lugs (32) and each lug (32) has a hole (322) defined therethrough. A pin (33) extends through the two holes (322) and movably extends through the first slot (25).

A second slot (26) is defined through the mounting arm (21) and oriented substantially in parallel with the direction of the tension force of the brake cable (70). A sleeve (35) movably extends through the second slot (26) and a threaded hole (352) is defined transversely through the sleeve (35). A first hole (262) and a second hole (264) are respectively defined through the mounting arm (21), the first hole (262) and the second hole (264) respectively communicating with the second slot (26). The first hole (262), the second slot (26) and the second hole (264) are located in alignment with each other. An adjusting bolt (27) extends through the first hole (262), the second slot (26), the sleeve (35) and the second hole (264), wherein the adjusting bolt (27) threadedly extends the threaded hole (352) of the sleeve (35) in the second slot (26). An end member (272) is fixedly connected to the adjusting bolt (27) on the outside of the mounting arm (21). Therefore, when rotating the adjusting bolt (27), the sleeve (35) will be moved in the second slot (26). The sleeve

(35) has a head connected to the first end thereof and an engaging hole (353) is defined in the second end of the sleeve (35) so that a cap (354) is engaged with the engaging hole (353).

A connecting means (34) is connected between the sleeve (35) and the pin (33). The connecting means (34) includes two plates located on two sides of the mounting arm (21). Each plate has a third hole (342) defined through the first end thereof so as to mount to the pin (33), and a fourth hole (344) defined through the second end of each plate so as to mount to the sleeve (35).

Figure 3:
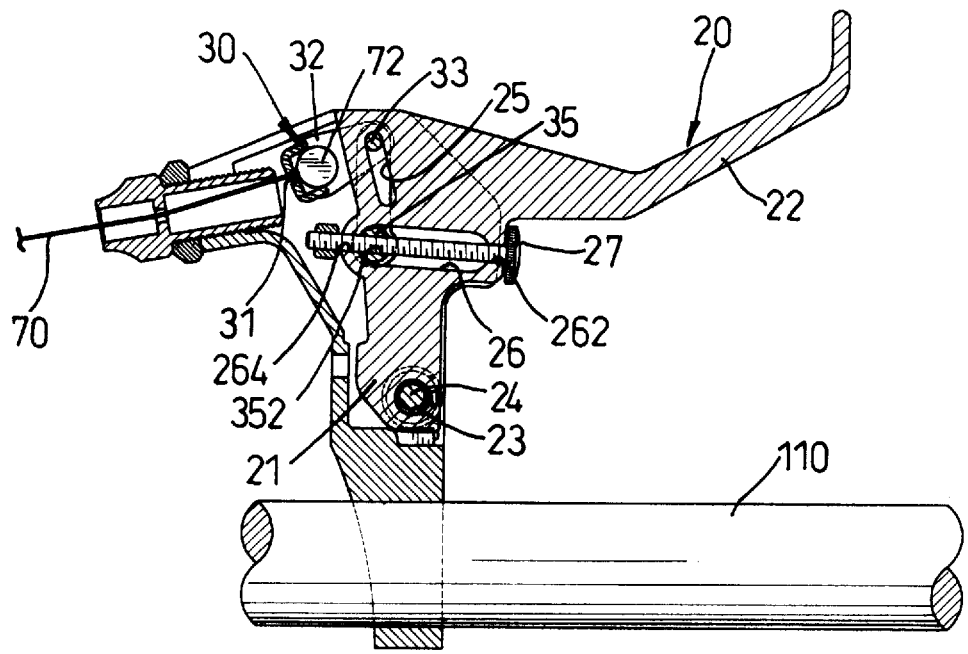
FIG. 3 is a side elevational view, partly in section, of the brake lever device in accordance with the present invention, wherein the sleeve is located close to the bracket and the pin is located on the top end of the first slot, the grip part of the brake lever device is not yet pulled.
Figure 4:
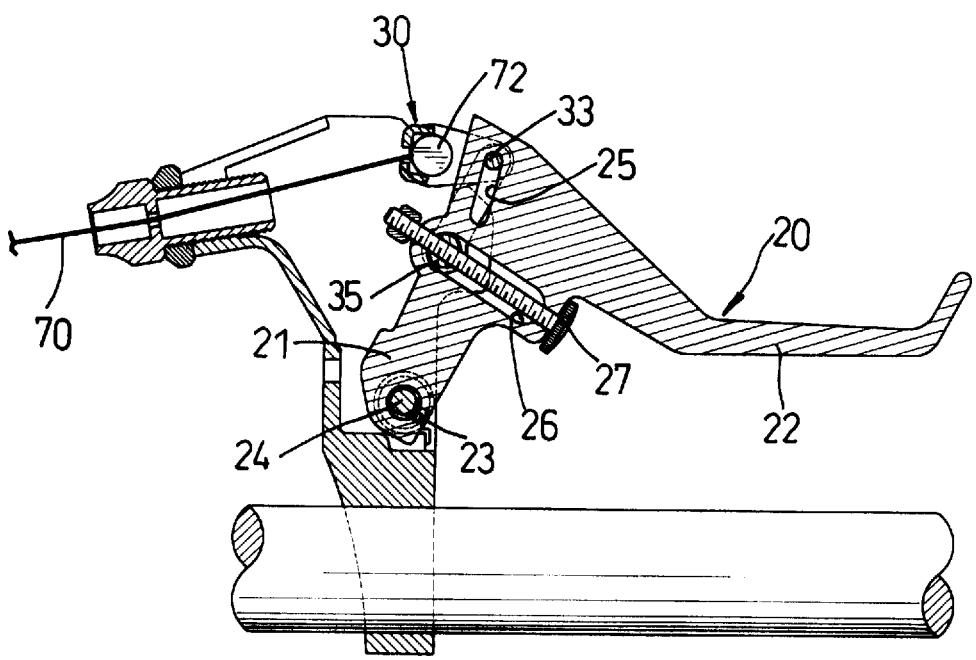
FIG. 4 is a side elevational view, partly in section, of the brake lever device as shown in FIG. 3, wherein the grip part of the brake lever device is pulled.
Figure 5:
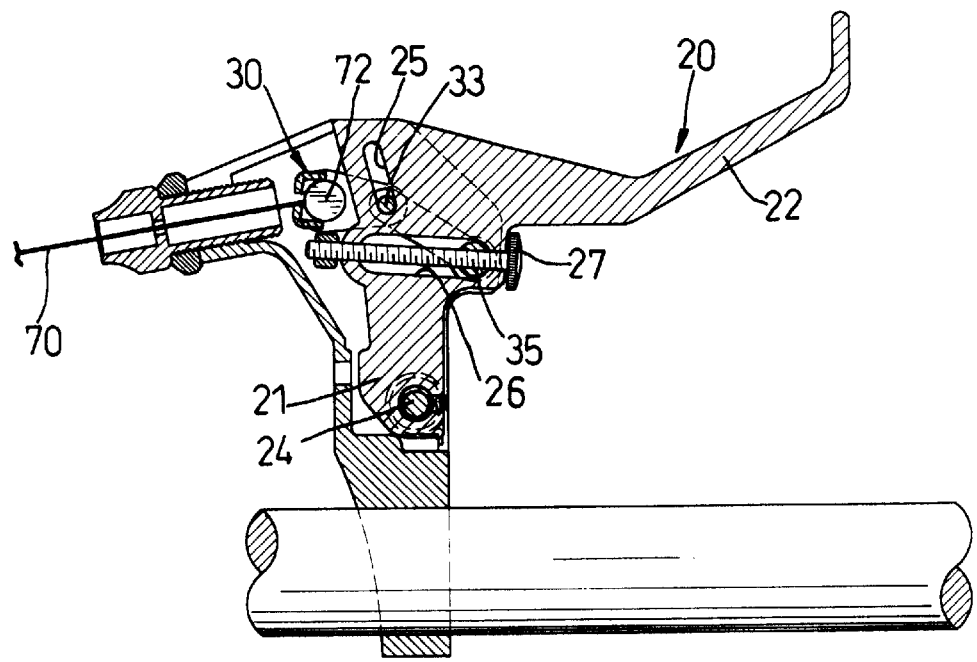
FIG. 5 is a side elevational view, partly in section, of the brake lever device in accordance with the present invention, wherein the sleeve is moved away from the bracket and the pin is moved to the lower end of the first slot, the grip part of the brake lever device is not yet pulled.
Figure 6:
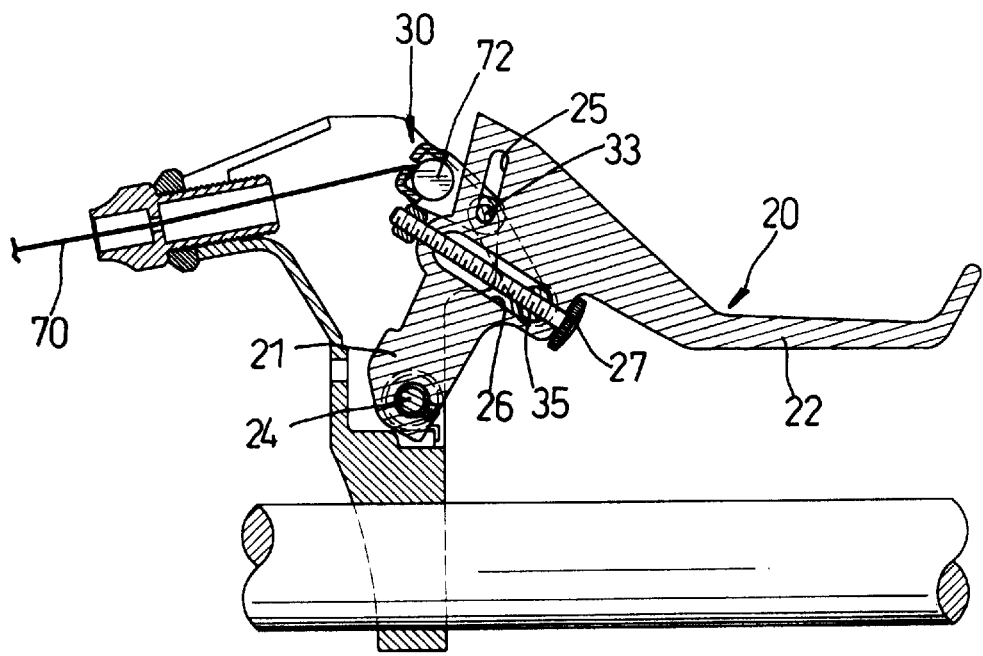
FIG. 6 is a side elevational view, partly in section, of the brake lever device as shown in FIG. 5, wherein the grip part of the brake lever device is pulled.

Referring to FIGS. 3 and 4, when the sleeve (35) is located in the end of the second slot (26) near the bracket (30), and the pin (33) is located at the top end of the first slot (25), the distance from the pin (24) to the pin (33) is the longest. Therefore, the pulling force needed to pull the grip part (22) is large. When rotating the adjusting bolt (27) as shown in FIGS. 5 and 6, the sleeve (35) is moved away from the bracket (30) and the pin (33) is therefore lowered to the lower end of the first slot (25) because the connection of the connecting means (34). The distance between the pin (24) and the pin (33) is less than the distance shown in FIG. 3, so that it requires less force to pull the grip part (22).

Because the second slot (26) is oriented substantially in parallel with the direction of the tension force of the brake cable (70) so that the movement of the sleeve (35) is easily by rotating the adjusting bolt (27). It is noted that the orientation of the first slot (25) will affect the distance that the brake cable (70) is pulled when the pin (33) is located at different position in the first slot (25).

Although the invention has been explained in relation to its preferred embodiment, it is to be understood that many other possible modifications and variations can be made without departing from the spirit and scope of the invention as hereinafter claimed.

What is claimed is:

1. A brake lever device for a bicycle which has a body (10) mounted to a handlebar of the bicycle, a brake cable (70) movably extending through the body (10) and having a cast lug barrel (72) connected to a distal end of the brake cable (70), said brake lever device comprising:

a brake lever (20) having a grip part (22) and a mounting arm (21) extending laterally from said grip part (22), said mounting arm (21) adapted to be pivotally connected to the body (10), a first slot (25) defined through said mounting arm (21), a second slot (26) defined through said mounting arm (21) and adapted to be oriented substantially in parallel with the direction of the tension force of the brake cable (70);

a bracket (30) having a receiving portion (31) connected to the first end thereof and said receiving portion adapted to receive the cast lug barrel (72), the second end of said bracket (30) having a pin (33) extending therethrough and said pin (33) movably extending through said first slot (25);

a sleeve (35) movably extending through said second slot (26) and a threaded hole (352) defined transversely through said sleeve (35), an adjusting bolt (27) extending through said second slot (26) and threadedly extending said threaded hole (352) of said sleeve (35), an end member (272) fixedly connected to said adjusting bolt (27) on the outside of said mounting arm (21), and a connecting means (34) connected between said sleeve (35) and said pin (33).

2. The brake lever device as claimed in claim 1, wherein said bracket (30) has two lugs (32) extending from the second end thereof and each lug (32) has a hole (322) defined therethrough for said pin (33) extending through said two holes (322), said mounting arm (21) located between said two lugs (32).

3. The brake lever device as claimed in claim 1, wherein said sleeve (35) has a head connected to the first end thereof and an engaging hole (353) defined in the second end of said sleeve (35), a cap (354) engaged with said engaging hole (353).

4. The brake lever device as claimed in claim 1, wherein said connecting means (34) includes two plates located on two sides of said mounting arm (21), each plate having a third hole (342) defined through the first end thereof so as to mount to said pin (33), and a fourth hole (344) defined through the second end of each plate so as to mount to said sleeve (35).

5. The brake lever device as claimed in claim 1, wherein said mounting arm (21) has a first hole (262) and a second hole (264) respectively defined therethrough, said first hole (262) and said second hole (264) respectively communicating with said second slot (26).

6. The brake lever device as claimed in claim 5, wherein said first hole (262), said second slot (26) and said second hole (264) are located in alignment with each other.

* * * * *